US006145917A

United States Patent [19]

Ishii et al.

[11] Patent Number: 6,145,917

[45] Date of Patent: Nov. 14, 2000

[54] DOOR OPERATING APPARATUS FOR VEHICLE

[75] Inventors: Yuichi Ishii; Masaharu Matsumoto, both of Yokohama, Japan

[73] Assignee: Ohi Seisakusho Co., Ltd., Yokohama, Japan

[21] Appl. No.: 09/175,441

[22] Filed: Oct. 20, 1998

[30] Foreign Application Priority Data

Oct. 20, 1997 [JP] Japan .................................... 9-286395

[51] Int. Cl.[7] ........................................................ B60J 5/10

[52] U.S. Cl. .................................... 296/146.1; 296/146.4; 296/146.8

[58] Field of Search ............................ 296/146.1, 146.4, 296/146.8, 56, 76, 106, 146

[56] References Cited

U.S. PATENT DOCUMENTS 5,531,498 7/1996 Kowall ................................ 296/146.4

FOREIGN PATENT DOCUMENTS 5-195666 8/1993 Japan .

*Primary Examiner*—D. Glenn Dayoan
*Assistant Examiner*—Greg Blankenship
*Attorney, Agent, or Firm*—Foley & Lardner

[57] ABSTRACT

A door operating apparatus for a vehicle back door is comprised of a wire, a winding mechanism, a guide pulley, a tension mechanism and a stopper. The winding mechanism is installed at one of a vehicle body and the back door and is connected to an end of the wire. The winding mechanism winds and releases the wire according to a command signal. The guide pulley is installed at the other one of the vehicle body of the back door with respect to the winding mechanism and supports the wire. The tension mechanism is connected to the other end of the wire and always pulling the wire. The stopper prevents the wire from being sent from the tension mechanism at a predetermined point. Therefore, even if the back door is manually opened and closed, the wire is kept in a tensioned state by means of the tension mechanism to enable smooth opening and closing during manual operations.

11 Claims, 6 Drawing Sheets

DOOR OPERATING APPARATUS FOR VEHICLE

BACKGROUND OF THE INVENTION

The present invention relates to a door operating apparatus for opening and closing a door for a vehicle, and more particularly to a door operating apparatus which electrically opens and closes a back door supported to a rear portion of a vehicle body.

Japanese Patent Provisional Publication No. 5-195666 discloses a vehicle back-door operating apparatus which automatically opens and closes a back door by releasing and winding a wire by means of motive power of a motor. This conventional operating apparatus is arranged to control the operation speed of the motor in order to prevent the wire from being loosen by the difference between a door opening and closing speed and a wire sending speed.

However, if the conventional back-door operating apparatus has electrical trouble, the wire can be not wound by means of the motor. Accordingly, when the back door is manually closed under an electrically troubled condition, the wire is kept at a loosened state. Therefore, it is necessary for a manual operator to pay attention to the wire during the manual closing operation under the electrically troubled condition so as not to clump the wire between the back door and a vehicle body contacted with the back door. On the other hand, when the closed back door is manually opened in a wire loosened condition, it is necessary to carefully execute the manual door opening operation upon paying attention to the loosened wire so as not to hock it on baggage or operations' body.

SUMMARY OF THE INVENTION

It is an object of the present invention to provide an improved door operating apparatus which enables manual door opening and closing operations to be smoothly executed even if the door operating apparatus has electrical trouble. An door operating apparatus according to the present invention is for a vehicle back door installed to a vehicle body. The operation apparatus comprises a wire, a winding mechanism, a guide pulley, a tension mechanism, a tension mechanism and a stopper. The winding mechanism is installed at one of the vehicle body and the back door and is connected to an end of the wire. The winding mechanism winds and releases the wire according to a signal. The guide pulley is installed at the other one of the vehicle body and the back door and supports the wire. The tension mechanism is connected to the other end of the wire and always pulls the wire. The stopper prevents the wire from being sent from the tension mechanism.

DETAILED DESCRIPTION OF THE INVENTION

Referring to FIGS. 1 to 5, there is shown a first embodiment of a door operating apparatus for a vehicle back door in accordance with the present invention.

Figure 1:
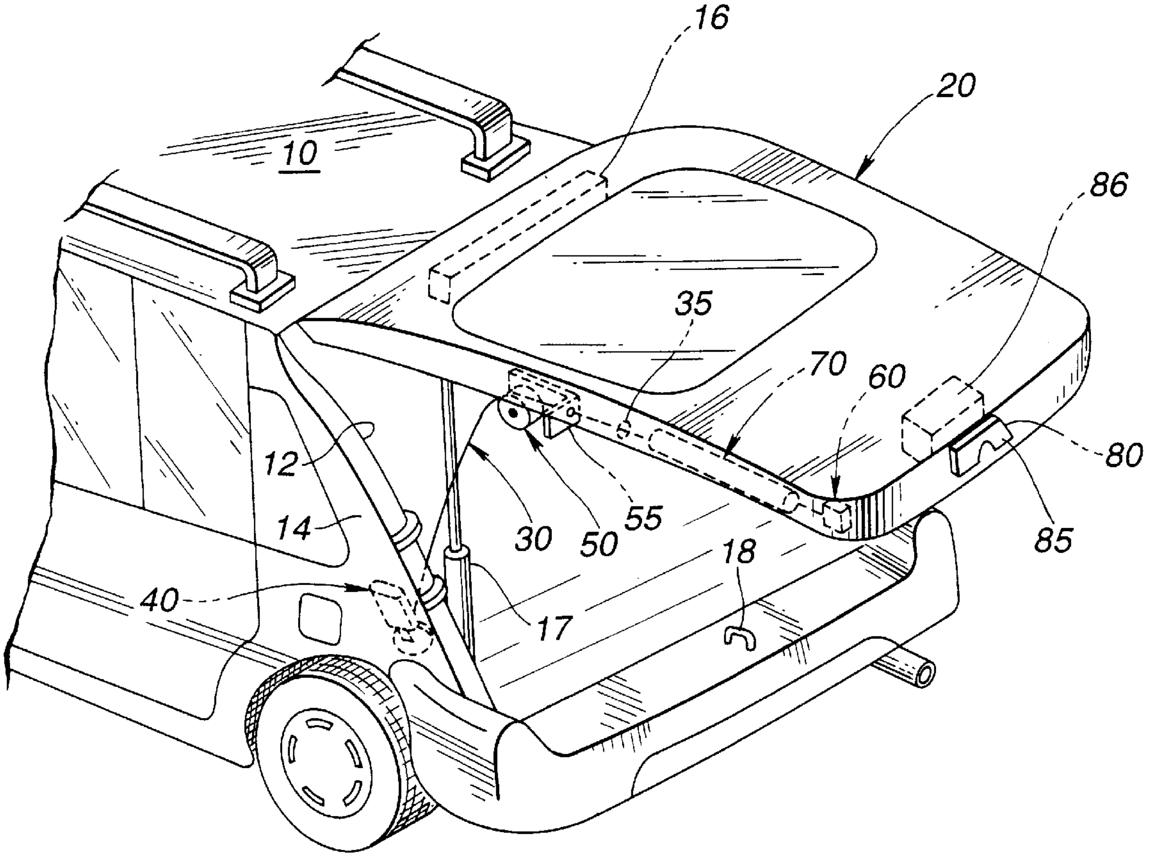
FIG. 1 is a perspective view of a door operating apparatus for a vehicle back door of a first embodiment in accordance with the present invention.
Figure 2:
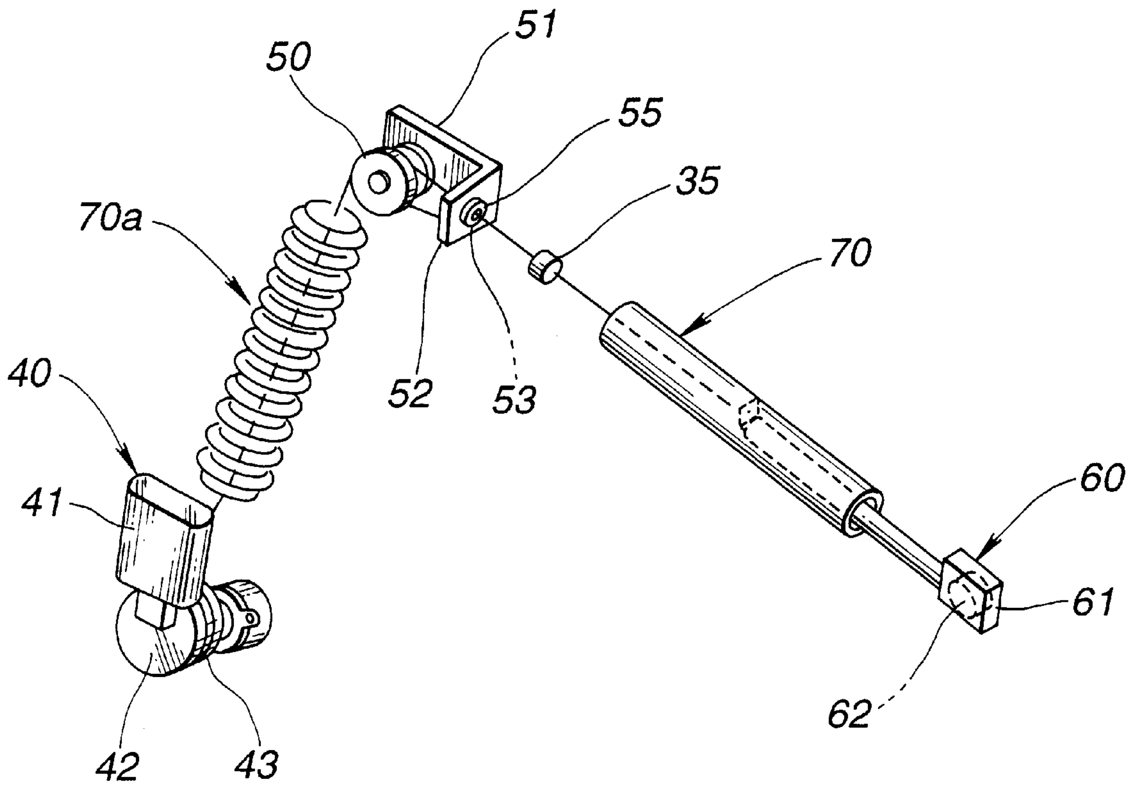
FIG. 2 is a partial perspective view of the door operating apparatus for the vehicle back door of FIG. 1.

As shown in FIG. 1, a back door 20 is swingably connected to an upper peripheral portion 14 of a rear opening defining portion 12 of a vehicle body 10. The door operating apparatus according to the present invention is mainly used for automatically opening and closing the back door 20. The door operating apparatus comprises a wire 30, a winding mechanism 40, a guide pulley 50, a stopper 55, a tension mechanism 60 and a cover 70. As shown in FIGS. 1 and 2, the winding mechanism 40 is disposed at a side peripheral portion of the rear opening defining portion 12 of the vehicle body 10. The winding mechanism 40 comprises a drive motor 41, a reducer 43 and a winding drum 43. An end of the wire 30 is connected to the winding drum 43, and the wire 30 is wound on the winding drum 43 by rotating the winding drum 43 through the operation of the drive motor 41.

The guide pulley 50 is installed through a base member 51 on a peripheral portion of the back door 20 which portion is faced with the installed portion of the winding mechanism 40 in a back door closed state as shown in FIG. 1. The wire 30 extended from the winding drum 43 is set on the guide pulley 50 and further extends along a side peripheral portion of the back door 20. The extended end of the wire 30 is connected to the tension mechanism 60. The tension mechanism 60 is arranged to pull the other end of the wire 30 in the tension mechanism by a predetermined pull force so as to keep a predetermined tension in the wire 30. The tension mechanism 60 is constituted by a coil member 62 covered with a case 61. The other end of the wire 30 is connected to a tip end portion of the coil member 62 so that a recovery force of the coil member 62 tensions the wire 30.

An end portion of the base member 51 is bent perpendicular to form a flange portion 52. The flange portion 52 has a through hole 53 through which the wire 30 extends from the guide pulley 50 to the tension mechanism 60. Disposed between the through hole 53 and the tension mechanism 60 is a contact member 35 fixedly connected to the wire 30. A stopper 55 is installed to the through hole 53 of the base member 51. When the stopper 55 is in contact with the contact member 35 fixed to the wire 30, the wire 30 is prevented from further sliding out from the tension mechanism 60, and the winding mechanism 40 functions to close the back door 30 through a wire winding operation thereof. A cylindrical cover 70 is installed along the side peripheral portion of the back door 20 to cover the wire 30 located between the guide pulley 50 and the tension mechanism 60. The end portion of the wire 30 and the tip end portion of coil member 62 are movably disposed in the cylindrical cover 70. The wire 30 located between the winding mechanism 40 and the guide pulley 50 is covered with a bellows-type cover 70*a*. The bellows-type cover 70*a* is arranged to change its length according to the opening degree of the back door 20.

As shown in FIG. 1, an urethane-rubber member 16 is installed at an upper peripheral portion of the rear opening defining portion 12 of the vehicle body 10. A gas damper stay 17 is installed between the vehicle body 10 and the back door 20. The urethane-rubber member 16 and the gas damper stay 17 apply a biasing force to the back door 20 directing in the door opening direction. Installed at a lower peripheral portion of the back door 20 are a lock mechanism 80, a forced door close mechanism 85 and a lock releasing actuator 86. The lock mechanism 80 is arranged to engage with a striker 18 installed at a lower portion of the rear opening defining portion 12 to arrest the back door 20 in a close state. After the lock mechanism 80 is engaged with the striker 18, the forced door close mechanism 85 forcedly pulls the striker 18 to fully (perfectly) close the back door 20.

Figure 3:
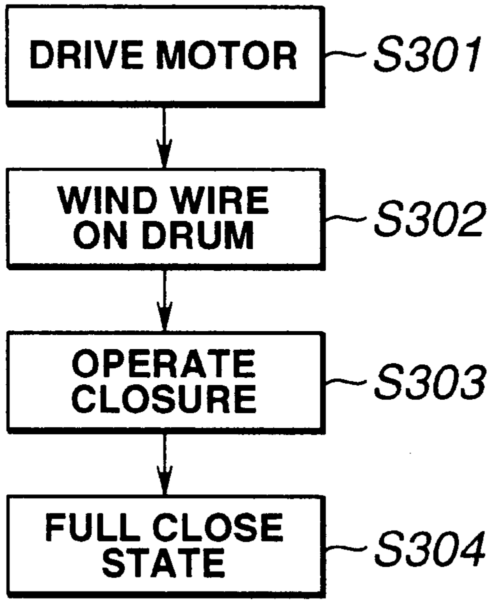
FIG. 3 is a flowchart for explaining an electrical closing operation of the back door.
Figure 4:
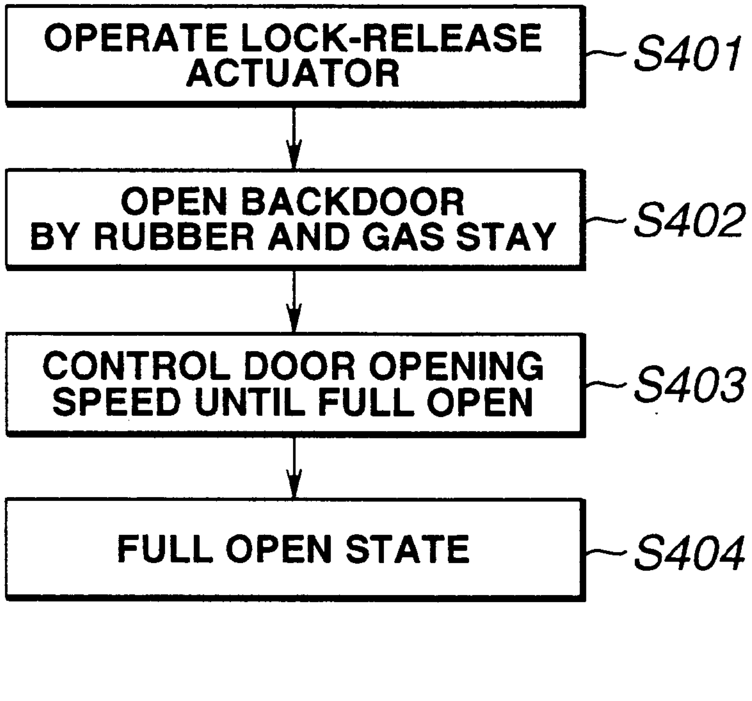
FIG. 4 is a flowchart for explaining an electrical opening operation of the back door.
Figure 5:
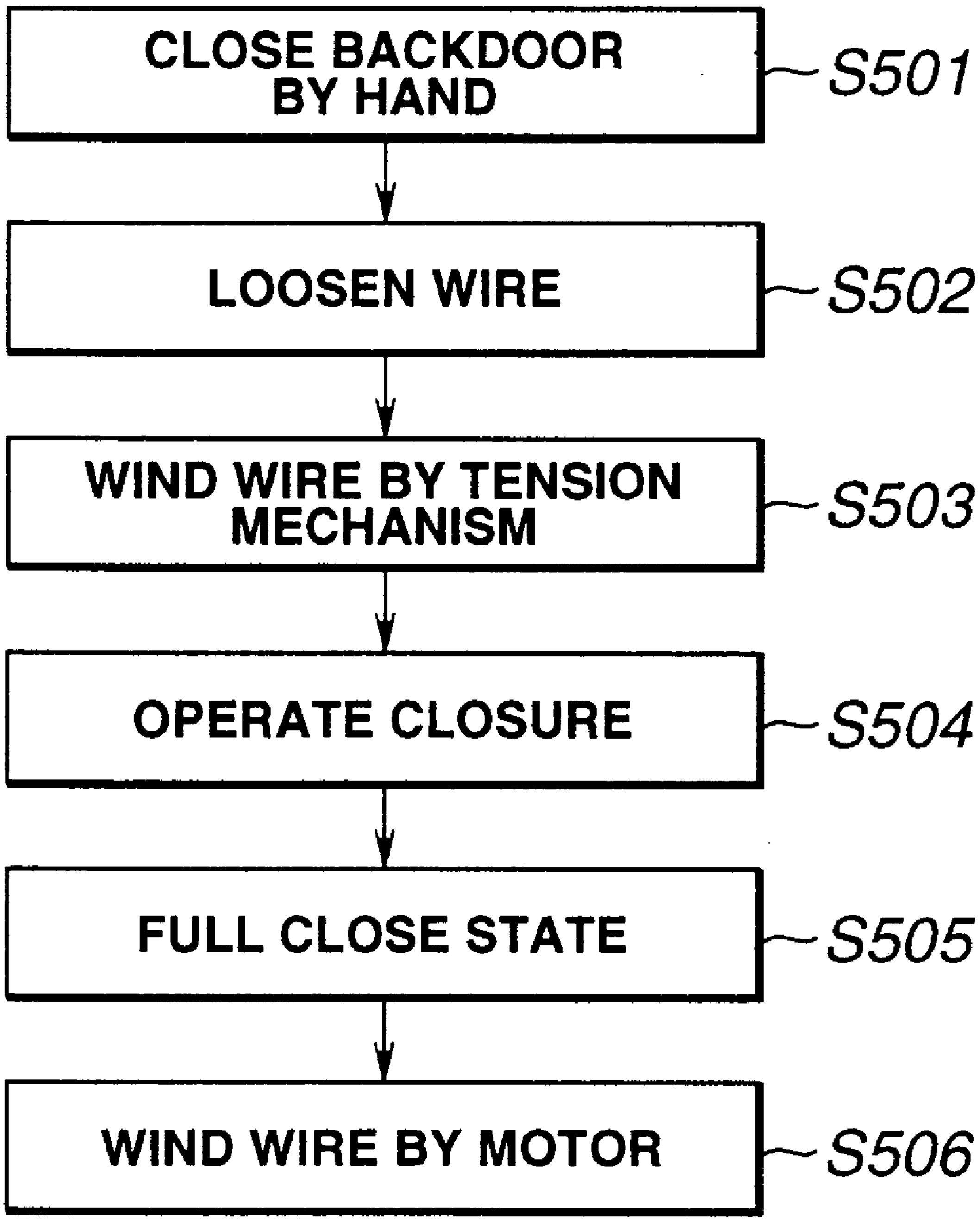
FIG. 5 is a flowchart for explaining a manual closing operation of the back door.

The manner of operation of the door operating apparatus for the vehicle back door in accordance with the present invention will be discussed hereinafter with reference to flowcharts of FIGS. 3 to 5.

First, the manner of an electrical closing operation in case that the opening/closing apparatus is normally operated will be discussed with reference to the flowchart of FIG. 3.

In step S301, the drive motor 41 is put in an operating state. That is, the winding mechanism 40 winds the wire 30. The wire 30 slides out from the tension mechanism 60, and the contact member 35 fixed to the wire 30 comes in contact with the stopper 55 to prevent the wire 30 from sliding further from the tension mechanism 60.

In step S302, the winding mechanism 40 functions to close the back door 20 by winding the wire 30 by means of the winding drum 43 being rotated by the motor 41.

In step S303, the lock mechanism 80 with the striker 18 so as to hold the back door 20 in the provisional closed state. Then, the forced door closing mechanism 85 forcibly pulls the striker 18.

In step S304, the full close state of the back door 20 is established by the above operations. Then, the drive motor 41 is inversely driven by a small amount so as to slightly loosen (release) the wire 30. This slight loosening operation is executed in order that the back door 20 is put in a restraint cancelled state when the lock mechanism 80 cancels the lock state thereof.

On the other hand, the manner of the electrical door opening operation is proceeded along the flowchart of FIG. 4 as follows.

In step S401, the lock release actuator 86 cancels the locked state of the back door 20.

In step S402, the urethane-rubber member 16 and the gas stay 17 push the back door 20 in the door opening direction. Therefore, the back door 20 is automatically opened.

In step S403, during a period until the back door 20 is open, the rotation speed of the drive motor 41 is controlled so that the winding mechanism 40 properly releases the wire 30 and that the tension mechanism 60 pulls the wire 30. By this speed control, the wire 30 is put in a properly tensioned state between the winding mechanism 40 and the guide pulley 50.

In step S404, the back door 20 is put in a full open state by the above operations.

Next, the manner of a manual closing operation executed by a vehicle operator will be discussed with reference to the flowchart of FIG. 5.

In step S501, a vehicle occupant or other person manually closes the back door 20.

In step S502, during the manual closing operation, the wire 30 is momentarily loosened between the winding mechanism 40 and the tension mechanism 60.

In step S503, the tension mechanism 60 pulls the loosened amount of the wire 30 so as to cancel the loosening of the wire 30. Therefore, the wire 30 is properly tensioned between the winding mechanism 40 and the tension mechanism 60 even during the manual door opening operation. Accordingly, it is not necessary to pay attention as to whether the wire 30 is clamped between the peripheral portion 14 of the rear opening defining portion 12 and the back door 20. This enables the manual back door opening operation to be smoothly executed.

In step S504, the lock mechanism 80 is engaged with the striker 18 so as to hold the back door 20 in the closed state. Then, the forced door closing mechanism 85 forcibly pulls the striker 18.

In step S505, the full close state of the back door 20 is established by the above operations.

In step S506, the winding mechanism 40 winds the wire 30 by the loosened amount except for the amount pulled by the tension mechanism 60. If the door operating apparatus has electrical trouble, the wire 30 except for that pulled by the tension mechanism 60 is left as it was loosened. However, the manual closing operation is smoothly executed.

On the other hand, in the case that the back door 20 is manually opened, the wire 30 is sent from the tension mechanism 60 while keeping a proper tensioning state between the winding mechanism 40 and the tension mechanism 60. Since the wire 30 is not put in the loosened state even during the manual closing operation, the wire 30 is free from troubles caused by contacting with baggage or occupant. Therefore, it is possible to smoothly execute the manual opening operation of the back door 20 without paying attention to the wire 30.

Since the cover member *70a* is expanded and retracted in relation with the opening degree of the back door 20, the wire 30 located between the winding mechanism 40 and the guide pulley 50 is always covered with the cover member *70a*. This cover improves the degree of the safety and the external appearance of the door operating apparatus.

Figure 6:
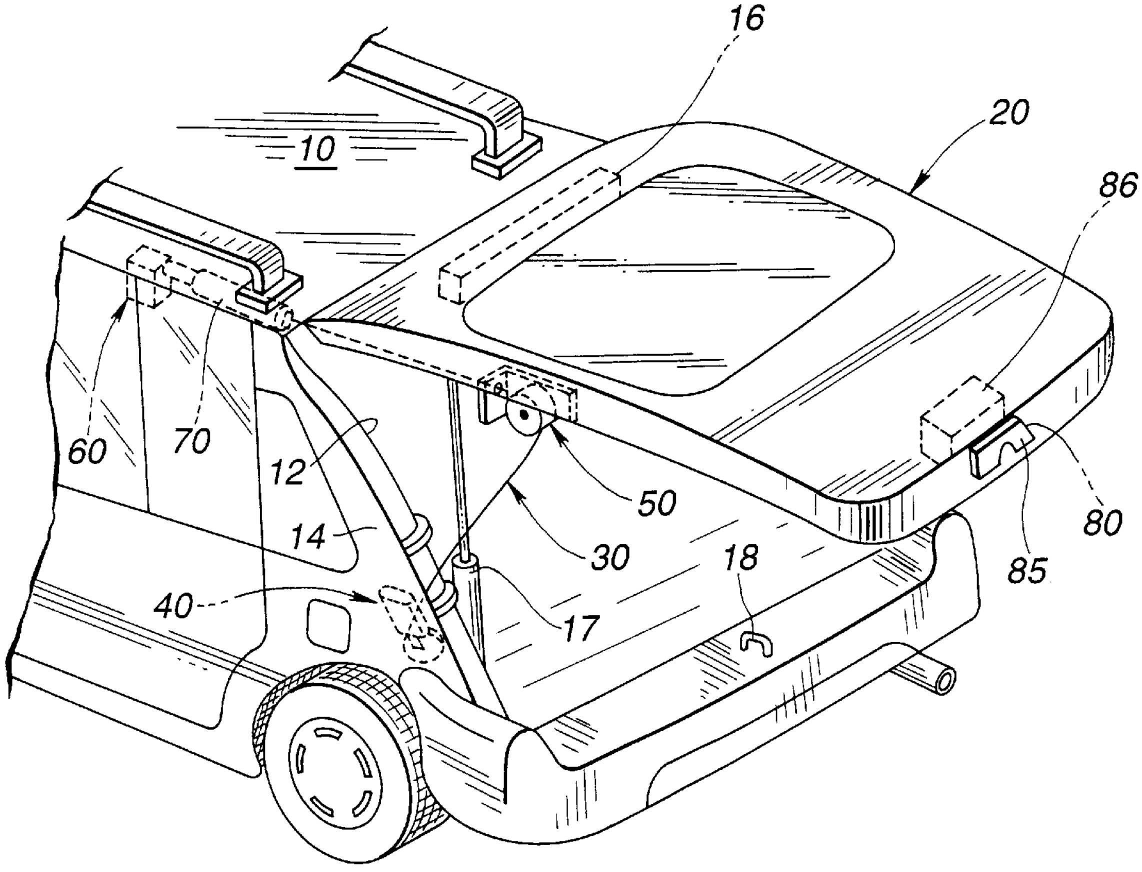
FIG. 6 is a perspective view of the door operating apparatus for the vehicle back door of a second embodiment in accordance with the present invention.
Figure 7:
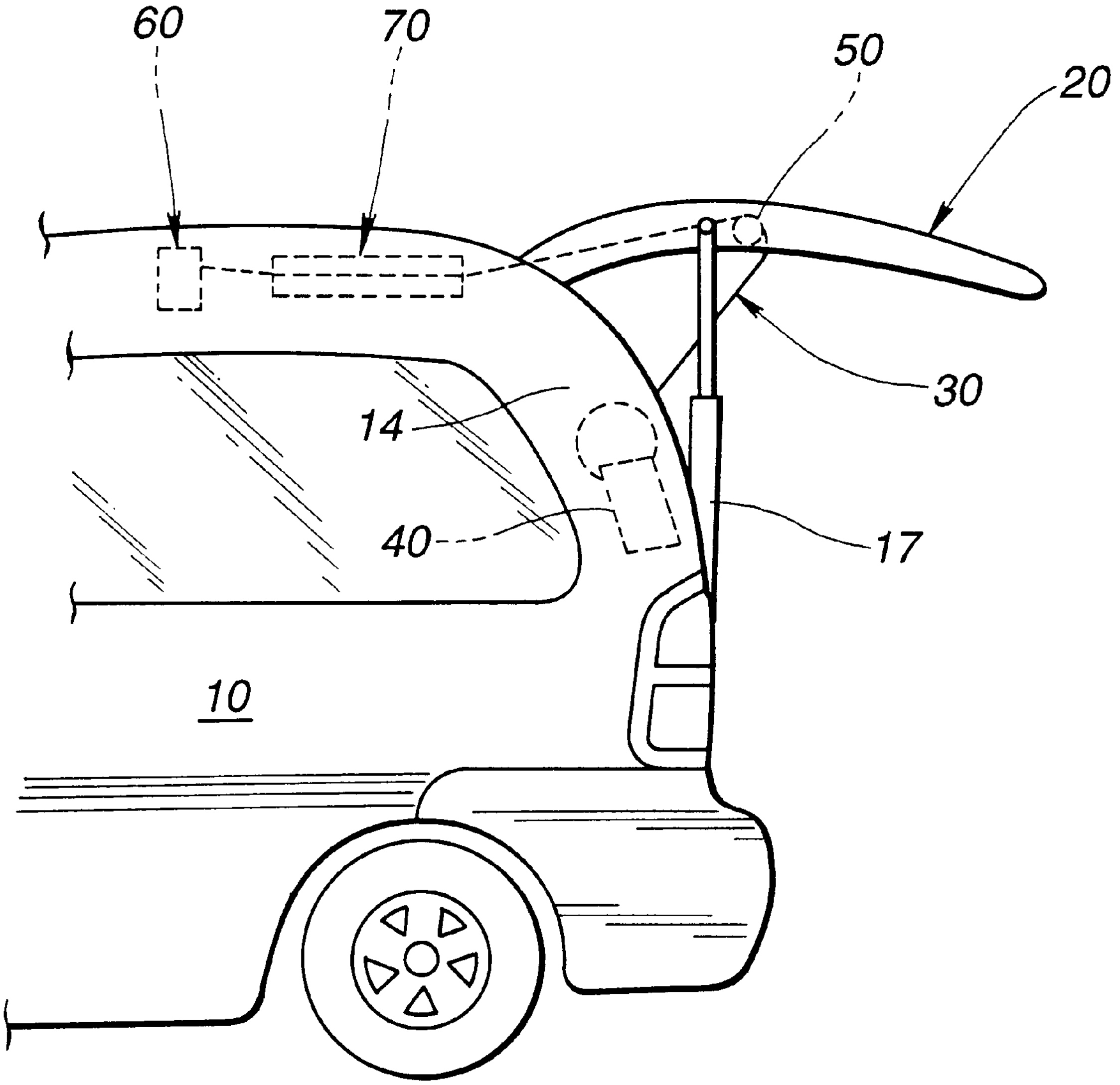
FIG. 7 is a side view showing the door operating apparatus of FIG. 6.

Referring to FIGS. 6 and 7, there is shown a second embodiment of the door operating apparatus for the vehicle back door in accordance with the present invention. The second embodiment is different from the first embodiment in the arrangement of the tension mechanism 60 to the vehicle body 10. That is, the tension mechanism 60 is installed at a side peripheral portion of a ceiling of the vehicle body 10. The wire 30 connected to the winding mechanism 40 is extended through the guide pulley 50 and along the side peripheral portion of the ceiling of the vehicle body 10 to the tension mechanism 60. The other end of the wire 30 is connected to the coil member 62 of the tension mechanism 60. Since the manner of the opening and closing operation by the door operating apparatus of the second embodiment is the same as that of the first embodiment, the explanation thereof will be omitted herein.

Furthermore, it will be understood that both of the winding mechanism 40 and the tension mechanism 60 may be installed at one place of the vehicle body 10 or the back door 20. The installation largely facilitates the assembly process of the opening/closing apparatus. In such a case, both of the winding mechanism 40 and the tension mechanism 60 may be installed at one base member. This arrangement will largely improve the assembly operation of the opening/closing apparatus. Furthermore, in this case, the wire 30 is extended from the winding mechanism 40 to the guide pulley 50 disposed at an opposite side of the winding mechanism 40, and the wire 30 hooked around the guide pulley 50 is extended to the tension mechanism 60 disposed together with the winding mechanism 40. Accordingly, the wire 30 is arranged to form a U-shape. It will be understood that the U-shape arranged wire 30 may be covered with the bellows type cover 70*a*.

Thus, with the opening/closing apparatus according to the present invention, the wire 30 is kept to be properly tensioned between the winding mechanism 40 and the guide pulley 50, even when the back door 20 is manually opened or closed. Therefore, the opening and closing operation of the back door 20 is smoothly executed without paying attention to the wire 30.

Furthermore, in the case that both the winding mechanism 40 and the tension mechanism 60 are installed at one place of the vehicle body 10 or the back door 20, the assembly operation of the opening/closing apparatus is largely improved.

The entire disclosure of Japanese Patent Application No. 9-286395 filed on Oct. 20, 1997 including specification, claims, drawings and summary is incorporated herein by reference in its entirety.

What is claimed is:

1. A door operating apparatus for a vehicle back door installed to a vehicle body, the door operating apparatus comprising:

a wire;

a winding mechanism installed at one of the vehicle body and the back door, said winding mechanism being connected to an end of said wire, said winding mechanism winding and releasing said wire according to a signal;

a guide pulley installed at the other one of the vehicle body and the back door with respect to said winding mechanism, said guide pulley supporting said wire;

a tension mechanism connected to the other end of said wire, said tension mechanism always pulling said wire; and a stopper preventing said wire from being sent from said tension mechanism.

2. A door operating apparatus as claimed in claim 1, wherein both of said winding mechanism and said tension mechanism are installed at one of the vehicle body and the back door.

3. A back-door operating apparatus comprising:

a back door swingably connected to a vehicle body;

a wire having a first end connected to one of a vehicle body and the back door and a second end connected to the other one of the vehicle body and the back door;

a biasing means for always biasing said back door in a door opening direction;

a electrical winding mechanism installed at one of the vehicle body and the back door and being connected to the second end of said wire so as to wind said wire;

a lock mechanism restraining a swinging movement of said back door so as to fit said back door with the vehicle body; and a tension mechanism connected to the first end of said wire and absorbing a loosened amount of said wire.

4. A back-door operating apparatus as claimed in claim 3, wherein said lock mechanism includes a forced closing mechanism.

5. A back-door operating apparatus as claimed in claim 3, wherein said electrical winding mechanism winds said wire against a biasing force of said biasing means when said back door is closed, and said winding mechanism slowly releases said wire upon receiving the biasing force when said back door is opened.

6. A back-door operating apparatus as claimed in claim 3, wherein said electrical winding mechanism slightly releases said wire after said electrical winding mechanism winds said wire and after said lock mechanism puts said back door in a full close state.

7. A back-door operating apparatus as claimed in claim 3, wherein said electrical winding mechanism winds the loosened amount of said wire absorbed by said tension mechanism after said back door is manually closed.

8. A back-door operating apparatus as claimed in claim 3, wherein said biasing means includes a gas damper stay and a rubber member.

9. A back-door operating apparatus comprising:

a back door swingably connected to a vehicle body;

a wire having a first end and a second end;

a winding mechanism installed at one of the vehicle body and said back door, said winding mechanism being connected to the first end of said wire, said winding mechanism temporally winding and releasing said wire;

a guide pulley installed at the other one of the vehicle body and the back door with respect to said winding mechanism, said guide pulley supporting said wire;

a biasing member always biasing said back door in a door opening direction; and a tension mechanism connected to the other end of said wire, said tension mechanism always pulling said wire.

10. A back-door operating apparatus as claimed in claim 9, wherein an opening force of said biasing member is greater than a pulling force of said tension mechanism, and a winding force of said winding mechanism is greater than the opening force of said biasing member.

11. A back-door operating apparatus comprising:

a back door swingably connected to a vehicle body;

a wire having a first end connected to a vehicle body and a second end connected to said back door;

biasing means for biasing said back door in a door opening direction;

an electrical winding mechanism installed at the vehicle body and connected to the second end of said wire so as to wind said wire;

a lock mechanism restraining a swinging movement of said back door so as to fit said back door with the vehicle body; and a tension mechanism installed on said back door and connected to the first end of said wire so as to absorb a loosened amount of said wire.

* * * * *